July 8, 1941.   LA MAR S. COOPER   2,248,607
REFRIGERATING SYSTEM
Filed Nov. 30, 1939

Inventor:
La Mar S. Cooper,
by Harry E. Dunham
His Attorney.

Patented July 8, 1941

2,248,607

UNITED STATES PATENT OFFICE 2,248,607

REFRIGERATING SYSTEM

La Mar S. Cooper, Erie, Pa., assignor to General Electric Company, a corporation of New York Application November 30, 1939, Serial No. 306,911

5 Claims. (Cl. 62—8)

My invention relates to refrigerating systems, and particularly to the control of refrigerating systems which are provided with cooling capacity containers or hold-over tanks.

Refrigerating systems are sometimes provided with containers or tanks in which brine or a eutectic solution may be cooled or frozen to provide hold-over cooling capacity which is available when the refrigerating machine is not in operation. Such tanks or containers are commonly cooled by passing refrigerant through a coil arranged within the tank. When a refrigerating system utilizing a thermostatic expansion valve is employed for cooling the hold-over tank, it is important that some arrangement be provided for closing the valve and maintaining it closed after the compressor has stopped operating in order that refrigerant may not be flooded through the evaporator with possible damage to the compressor mechanism when it is again operated, and also with loss of refrigerating capacity of the eutectic tank.

Accordingly, it is an object of my invention to provide a refrigerating system including an evaporator controlled by a thermostatic expansion valve and having an improved arrangement for maintaining the valve closed during the "off" period of the refrigerating machine.

Another object of my invention is to provide a refrigerating machine including a cooling capacity reservoir and an evaporator controlled by a thermostatic expansion valve for cooling the reservoir and an improved arrangement for insuring adequate superheat of the suction gas for operation of the thermal element of the expansion valve and for maintaining the valve closed during the "off" period of the refrigerating machine.

Further objects and advantages of my invention will become apparent as the following description proceeds, and the features of novelty which characterize my invention will be pointed out with particularity in the claims annexed to and forming a part of this specification.

Figure 1:
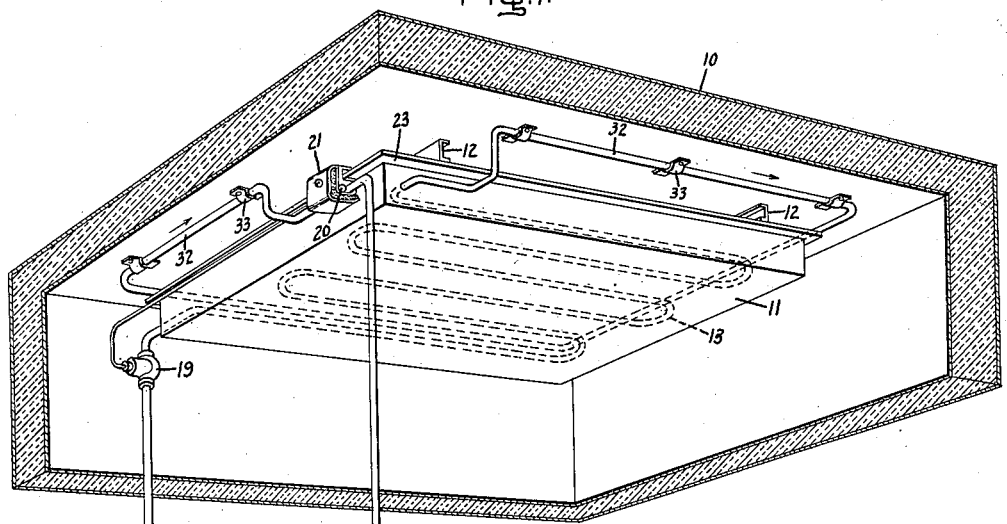
Figure 2:
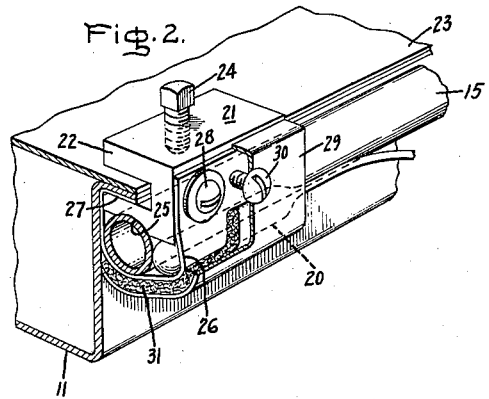

For a better understanding of my invention, reference may be had to the accompanying drawing in which Fig. 1 is a sectional perspective view of a corner of a casing or cabinet containing a compartment to be refrigerated and provided with a refrigerating system embodying my invention; and Fig. 2 is an enlarged perspective view showing the details of a clamp assembly for securing the thermal control bulb of the expansion valve in position in the refrigerating system shown in Fig. 1.

In the illustrate embodiment of my invention, an insulated casing such as that of a refrigerator or a refrigerated truck is provided with a cooling system including a tank or container partially filled with a substance for storing cooling capacity, such as brine or a eutectic solution. The cooling capacity of the substance is obtained by operation of a refrigerating machine having an evaporator coil associated with the tank in heat exchange relation with the substance to be cooled. During operation of the refrigerating machine, the flow of refrigerant through the evaporator is controlled by a thermostatic expansion valve arranged in the inlet line and having a thermal element or feeler bulb responsive to the temperature of the refrigerant withdrawn through the suction line. A clamp assembly is provided for securing a portion of the suction line and the thermal bulb in heat conducting relation with the storage tank in such a manner that during the operation of the refrigerating machine, the thermal bulb is primarily responsive to the temperature of the refrigerant in the suction line and during the "off" periods of the refrigerating machine it is responsive primarily to the temperature of the substance in the storage tank. This arrangement maintains the expansion valve closed when the refrigerating machine is not in operation, and thereby prevents objectionable flooding of the evaporator and possible damage to the refrigerating machine, and also loss of cooling capacity of the storage tank.

Referring now to the drawing, in Fig. 1 I have shown an insulated casing or refrigerator cabinet 10 such as is employed on refrigerated vehicles and which contains a compartment to be cooled. In order to cool the compartment within the casing I provide a tank or container 11 suspended from the upper wall of the compartment on channel irons 12. The tank 11 is partially filled with substance such as brine or a eutectic solution which may be frozen by operation of a refrigerant cooling coil or evaporator 13 having a number of turns arranged within the tank 11. The evaporator 13 is connected in the refrigerant circuit of a refrigerating machine including a compressor 14 arranged to withdraw vaporized refrigerant from the coil 13 through a suction line 15 and compress the refrigerant and discharge it into a condenser 16 where it is cooled and liquefied and from which it flows into a liquid receiver 17. The liquid refrigerant flows to the evaporator 13 from the liquid receiver 17 through a liquid line 18 under control of a thermostatic expansion valve 19 arranged in the liquid line adjacent the tank 11. The thermostatic expansion valve 19 is provided with a feeler bulb or thermal control element 20 secured in heat conducting relation to the suction line 15 by a clamp assembly 21. A refrigerating system of this type may be employed, for example, for the cooling of refrigerated trucks and is particularly useful when power for operating the refrigerating machine is not always available, such as with power take-off drive from the truck engine or electric power at a station from which the truck operates. When a truck is being prepared for a day's run, power is supplied to the refrigerating machine to drive the compressor 14 and operate the evaporator 13 to freeze the solution within the tank 11. During the freezing of the solution, heat is absorbed from the air and any articles stored within the compartment of the casing and also from the solution. When the solution has been frozen, the power supply is disconnected and the truck may then be operated for several hours during which the cooling capacity of the frozen solution is available to maintain the compartment and its contents adequately cooled. Should the thermostatic expansion valve be permitted to open or remain open after the refrigerating machine is stopped, additional warm liquid refrigerant would be supplied to the evaporator from the liquid receiver 17 and there would be danger of flooding the evaporator and also of allowing liquid refrigerant to flow into the suction line 15. Any liquid refrigerant collecting in the suction line 15 would be objectionable since it might result in damage to the compressor when it is next operated. In order to insure the closing of the valve 19 after the refrigerating machine has been stopped, I arrange the clamp assembly 21 so that the cooling capacity of the hold-over tank 11 is available to maintain the thermal element 20 at a sufficiently low temperature to keep the valve closed. It will be understood that the thermostatic expansion valve is of the conventional type in which a bellows or diaphragm operates to open the valve in accordance with the difference between a force proportional to the pressure in the evaporator and a force proportional to the temperature in the suction line, a rise in temperature in the suction line tending to open the valve. Valves of this type are employed to insure superheating of the suction gas and prevent the return of liquid refrigerant to the compressor; by a proper setting of the valve a predetermined number of degrees of superheat of the suction gas may be maintained.

The details of the arrangement of the clamp assembly 21 are more clearly shown in Fig. 2. The clamp comprises a relatively heavy U-shaped metal block or bracket 22 arranged to straddle a flange 23 formed around the edge of the tank 11 and to be clamped securely to the flange and in good heat conducting relation therewith by a screw 24. The lower side of the bracket 22 is provided with a rounded groove 25 in which a portion of the suction line 15 may be seated and a metal shield 26 is provided to hold the thermal bulb 20 and the suction line securely against the block 22 and in good heat conducting relation therewith and with each other. The shield 26 is securely clamped to the tank 11 by a flange portion 27 thereof which fits adjacent the flange 23 of the tank and is clamped tightly thereto when the screw 24 is tightened. The other end of the shield 26 is arranged to be secured to the outer end of the bracket 22 by one or more screws 28 which may readily be removed at any time to remove the bulb 20 and the suction line. In order to prevent changes of temperature of the bulb 20 due to the transfer of heat from the air and articles within the compartment, I provide a metal cover 29 which is secured in place around the shield 26 by a screw 30 and which holds a body of insulating material 31 securely in place about the shield 26 on its side remote from the clamp bracket 22. This shield and insulating material minimize the effect on the bulb 20 of temperature changes within the compartment.

During the operation of the refrigerating machine, liquid is admitted to the evaporator under control of the valve 19 and vaporized refrigerant is withdrawn therefrom through the suction line 15. Since there is very little change in temperature throughout the length of the evaporator within the eutectic tank because of the substantially constant temperature throughout the eutectic solution, it is desirable to provide some arrangement for supplying heat to the vaporized refrigerant between the outlet from the evaporator 13 and the portion of the suction line to which the bulb 20 is secured in order that the refrigerant gas be sufficiently superheated to effect proper control of the thermostatic expansion valve. In order to supply this additional heat, I secure a portion 32 of the suction line between the clamp assembly 21 and the eutectic tank 11 in contact with the inner wall or liner of the casing 10 and secured thereto by a plurality of clamps 33. Heat is, therefore, supplied to the gas passing through the portion 32 of the suction line since the wall or liner of the compartment 10 is at a higher temperature than the eutectic tank. During the operation of the refrigerating machine, the thermal bulb 20 is primarily responsive to the temperature of the gas flowing through the suction line 15. However, as soon as the operation of the compressor has been stopped and refrigerant is no longer being withdrawn through the suction line to affect the temperature thereof, the temperature of the thermal bulb 20 is dependent almost entirely upon the temperature of the eutectic tank 11 since a good heat conducting path is provided between the tank 11 and the bulb 20 by the bracket 22 and, since the suction line 15 is also secured closely adjacent the tank and the bracket, there is also a heat conducting path through the suction line between the tank 11 and the bulb 20. The bulb 20 is, therefore, maintained at substantially the temperature of the tank 11. This temperature is sufficiently low to maintain the valve 19 closed and, therefore, the arrangement of the bulb clamp assembly 21 keeps the valve 19 closed after the refrigerating machine has been stopped; this prevents the flooding of the evaporator with additional liquid refrigerant. The shields 26 and 29 and the insulating material 31 minimize any temperature changes which might be caused by the circulation of air about the bulb 20 and the radiation of heat from the liner and articles within the cabinet.

From the foregoing, it is readily apparent that I have provided a simple and effective arrangement for insuring the effective operation of a thermostatic expansion valve controlling the evaporator in a storage or hold-over tank and also for insuring the closing of the valve as soon as operation of the refrigerating machine has been suspended.

While I have illustrated and described a particular embodiment of my invention in connection with a refrigerating system for refrigerated vehicles and the like, other applications will readily be apparent to those skilled in the art. I do not, therefore, desire my invention to be limited to the construction shown and described, and I intend in the appended claims to cover all modifications within the spirit and scope of my invention.

What I claim as new and desire to secure by Letters Patent of the United States is:

1. A refrigerating system including a chilling unit for absorbing heat and a refrigerant evaporator for cooling said unit, a liquid line for admitting liquid refrigerant to said evaporator, a suction line for conducting vaporized refrigerant from said evaporator, a valve in said liquid line for controlling the admission of refrigerant to said evaporator, means including a thermal element adjacent said suction line and in thermal conducting relation therewith for actuating said valve, said thermal element being responsive primarily to the temperature of the refrigerant withdrawn through said suction line during the active periods of operation of said evaporator, and means providing a direct heat conducting path between said thermal element and said chilling unit for rendering said element responsive primarily to the temperature of said chilling unit during the inactive periods of operation of said evaporator.

2. A refrigerating system including a tank, a body of hold-over cooling capacity substance in said tank, a refrigerant evaporator having a liquid line and a suction line for cooling said substance, a valve in said liquid line for controlling the admission of refrigerant to said evaporator, means including a thermal element for actuating said valve, and a clamp for securing said thermal element in heat conducting relation to said suction line and to said tank, said clamp including a portion arranged to provide a heat conducting path between said element and said tank whereby said element is responsive primarily to the temperature of said tank during the inactive period of operation of said evaporator.

3. A refrigerating system including a tank, a body of hold-over cooling capacity substance in said tank, a refrigerant evaporator having a liquid line and a suction line for cooling said substance, a valve in said liquid line for controlling the admission of refrigerant to said evaporator, means including a thermal element for actuating said valve, a clamp for securing said thermal element in heat conducting relation to said suction line and to said tank, said clamp including a portion arranged to provide a heat conducting path between said element and said tank whereby said element is responsive primarily to the temperature of said tank during the inactive period of operation of said evaporator, and a heat insulating shield enclosing said thermal element and a portion of the suction line adjacent thereto on their sides remote from said portion of said clamp for minimizing the transfer of heat between said thermal element and the medium surrounding said tank.

4. A refrigerating system including an insulated casing having a compartment to be cooled, a tank having a body of hold-over cooling capacity substance therein and arranged in said casing for cooling the air in said compartment, a refrigerant evaporator arranged in said tank and having a liquid line and a suction line extending therefrom for cooling said substance, a valve in said liquid line for controlling the admission of refrigerant to said evaporator, means including a thermal element for actuating said valve, a clamp for securing said thermal element in heat conducting relation to said suction line, and said suction line having a portion thereof between said tank and said thermal element secured to a wall of said compartment to receive heat from said wall and supply heat to the refrigerant flowing from said evaporator.

5. A refrigerating system including an insulated casing having a compartment to be cooled, a tank having a body of hold-over cooling capacity substance therein and arranged in said casing for cooling the air in said compartment, a refrigerant evaporator arranged in said tank and having a liquid line and a suction line extending therefrom for cooling said substance, a valve in said liquid line for controlling the admission of refrigerant to said evaporator, means including a thermal element for actuating said valve, means for securing said thermal element in heat conducting relation to said suction line and to said tank, said securing means including a portion arranged to provide a heat conducting path between said element and said tank whereby said element is responsive primarily to the temperature of said tank during the inactive period of operation of said evaporator, and said suction line having a portion thereof between said tank and said thermal element secured to a wall of said compartment to receive heat from said wall and supply heat to the refrigerant flowing from said evaporator.

LA MAR S. COOPER.